(12) United States Patent
Mackenzie et al.

(10) Patent No.: US 11,456,497 B2
(45) Date of Patent: Sep. 27, 2022

(54) ELECTRIFIED VEHICLE THERMAL MANAGEMENT SYSTEMS WITH COMBINABLE BATTERY PACK AND ELECTRIC DRIVE COMPONENT COOLING CIRCUITS

(71) Applicant: FORD GLOBAL TECHNOLOGIES, LLC, Dearborn, MI (US)

(72) Inventors: Kevin Mackenzie, Canton, MI (US); Sunil Katragadda, Canton, MI (US); Ronald Richard Semel, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 16/714,961

(22) Filed: Dec. 16, 2019

(65) Prior Publication Data
US 2021/0184294 A1  Jun. 17, 2021

(51) Int. Cl.
| | |
|---|---|
| *H01M 10/6568* | (2014.01) |
| *B60L 50/64* | (2019.01) |
| *H01M 10/625* | (2014.01) |
| *H01M 10/48* | (2006.01) |
| *B60L 58/26* | (2019.01) |
| *H01M 10/66* | (2014.01) |
| *B60K 11/02* | (2006.01) |

(52) U.S. Cl.
CPC ......... *H01M 10/6568* (2015.04); *B60K 11/02* (2013.01); *B60L 50/64* (2019.02); *B60L 58/26* (2019.02); *H01M 10/486* (2013.01); *H01M 10/625* (2015.04); *H01M 10/66* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 7,287,581 B2 | 10/2007 | Ziehr et al. | |
| 8,448,696 B2 | 5/2013 | Johnston et al. | |
| 10,252,597 B2 | 4/2019 | Wallace et al. | |
| 2013/0175022 A1* | 7/2013 | King | B60H 1/00392 165/202 |
| 2013/0269911 A1* | 10/2013 | Carpenter | B60H 1/143 165/104.13 |
| 2016/0272040 A1* | 9/2016 | Cheng | B60K 1/04 |
| 2018/0050605 A1* | 2/2018 | Lewis | B60K 11/02 |

(Continued)

FOREIGN PATENT DOCUMENTS

| | | |
|---|---|---|
| EP | 3 012 133 B1 | 10/2017 |
| WO | 2019/121415 A1 | 6/2019 |

*Primary Examiner* — Jonathan Crepeau
(74) *Attorney, Agent, or Firm* — David B. Kelley; Carlson, Gaskey & Olds, P.C.

(57) ABSTRACT

This disclosure details thermal management systems for thermally managing battery packs and other electric drive components of electrified vehicles. An exemplary thermal management system may include a battery cooling circuit and an e-drive cooling circuit. The e-drive cooling circuit may be fluidly connected to the battery cooling circuit by a combination of valves and coolant lines during or in anticipation of certain vehicle conditions, such as high load operating conditions, to augment cooling of electric drive components during the high load operating conditions.

20 Claims, 4 Drawing Sheets

(56) References Cited

U.S. PATENT DOCUMENTS

| | | | | |
|---|---|---|---|---|
| 2019/0070924 A1* | 3/2019 | Mancini | ............ | B60H 1/00907 |
| 2020/0153377 A1* | 5/2020 | Shin | ...................... | B60L 50/60 |
| 2021/0331554 A1* | 10/2021 | Mancini | ............ | B60H 1/00921 |

* cited by examiner

ELECTRIFIED VEHICLE THERMAL MANAGEMENT SYSTEMS WITH COMBINABLE BATTERY PACK AND ELECTRIC DRIVE COMPONENT COOLING CIRCUITS

TECHNICAL FIELD

This disclosure relates to electrified vehicles, and more particularly to thermal management systems for thermally managing battery packs and other electric drive components of electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack may include one or more groupings of interconnected battery cells. The battery cells generate heat during certain conditions, including during charging and discharging operations. Thermal management systems may include a battery cooling circuit for managing the heat generated by the battery cells. Other electric drive components, such as electric motors, are typically thermally managed via a cooling circuit that is completely separate from the battery cooling circuit.

SUMMARY

A thermal management system according to an exemplary aspect of the present disclosure includes, among other things, a battery pack, a battery cooling circuit configured to thermally manage the battery pack, an electric drive component, an e-drive cooling circuit configured to thermally manage the electric drive component, and a first multi-position valve configured to control a flow of a coolant. In a first position of the first multi-position valve, the battery cooling circuit is fluidly isolated from the e-drive cooling circuit. In a second position of the first multi-position valve, the battery cooling circuit is fluidly connected to the e-drive cooling circuit such that the coolant is permitted to flow from the battery cooling circuit to the e-drive cooling circuit.

In a further non-limiting embodiment of the foregoing system, the electric drive component is an electric motor or an inverter system controller (ISC).

In a further non-limiting embodiment of either of the foregoing systems, the battery cooling circuit includes a coolant subsystem and a refrigerant subsystem.

In a further non-limiting embodiment of any of the foregoing systems, the coolant subsystem includes a chiller, a pump, the first multi-position valve, at least one T-joint, and a degas overflow bottle.

In a further non-limiting embodiment of any of the foregoing systems, the refrigerant subsystem includes a compressor, a condenser, a thermal expansion valve, and the chiller.

In a further non-limiting embodiment of any of the foregoing systems, the e-drive cooling circuit includes a coolant subsystem and a lubricant subsystem.

In a further non-limiting embodiment of any of the foregoing systems, the coolant subsystem includes a radiator, a degas overflow bottle, at least one T-joint, a pump, a heat exchanger, and a second multi-position valve.

In a further non-limiting embodiment of any of the foregoing systems, the lubricant subsystem includes a pump and the heat exchanger.

In a further non-limiting embodiment of any of the foregoing systems, the system includes a temperature sensor for monitoring a current temperature of the electric drive component.

In a further non-limiting embodiment of any of the foregoing systems, a control unit is in communication with the temperature sensor and configured to command the first multi-position valve to the second position in response to the current temperature of the electric drive component exceeding a predefined temperature value.

In a further non-limiting embodiment of any of the foregoing systems, the control unit is configured to command the first multi-position valve to the first position in response to the current temperature of the electric drive component being less than the predefined temperature value.

In a further non-limiting embodiment of any of the foregoing systems, a second multi-position valve is configured to control a return flow of the coolant from the e-drive cooling circuit back to a chiller of the battery cooling circuit.

In a further non-limiting embodiment of any of the foregoing systems, in a first position of the second multi-position valve, the return flow of the coolant is prevented from flowing to the chiller, and in a second position of the second multi-position valve, the return flow of the coolant is permitted to flow to the chiller.

In a further non-limiting embodiment of any of the foregoing systems, the first multi-position valve is disposed upstream from the battery pack within a coolant subsystem of the battery cooling circuit.

In a further non-limiting embodiment of any of the foregoing systems, a coolant line connects between the first multi-position valve and a T-joint of the e-drive cooling circuit.

A method according to another exemplary aspect of the present disclosure includes, among other things, controlling a flow of a coolant between a battery cooling circuit and an e-drive cooling circuit of a thermal management system of an electrified vehicle. Controlling the flow includes preventing the flow of the coolant from the battery cooling circuit to the e-drive cooling circuit when a current temperature of an electric drive component of the e-drive cooling circuit is less than a predefined temperature value and allowing the flow of the coolant from the battery cooling circuit to the e-drive cooling circuit when the current temperature of the electric drive component is greater than the predefined temperature value.

In a further non-limiting embodiment of the foregoing method, allowing the flow of the coolant includes actuating an outlet of a first multi-position valve from a closed position to an open position to fluidly connect the battery cooling circuit and the e-drive cooling circuit.

In a further non-limiting embodiment of either of the foregoing methods, allowing the flow of the coolant includes actuating an outlet of a second multi-position valve from a closed position to an open position to return a portion of the coolant from the e-drive cooling circuit back to the battery cooling circuit.

In a further non-limiting embodiment of any of the foregoing methods, allowing the flow of the coolant includes communicating the coolant through the outlet and then into a coolant line that connects between the first multi-position valve and a T-joint of the e-drive cooling circuit.

In a further non-limiting embodiment of any of the foregoing methods, the method includes automatically allowing the flow of the coolant from the battery cooling circuit to the e-drive cooling circuit to pre-chill the electric drive component in response to a location signal or a drive mode input signal.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details thermal management systems for thermally managing battery packs and other electric drive components of electrified vehicles. An exemplary thermal management system may include a battery cooling circuit and an e-drive cooling circuit. The e-drive cooling circuit may be fluidly connected to the battery cooling circuit by a combination of valves and coolant lines during or in anticipation of certain vehicle conditions, such as high load operating conditions, to augment cooling of electric drive components during the high load operating conditions. These and other features are discussed in greater detail in the following paragraphs of this detailed description.

Figure 1:
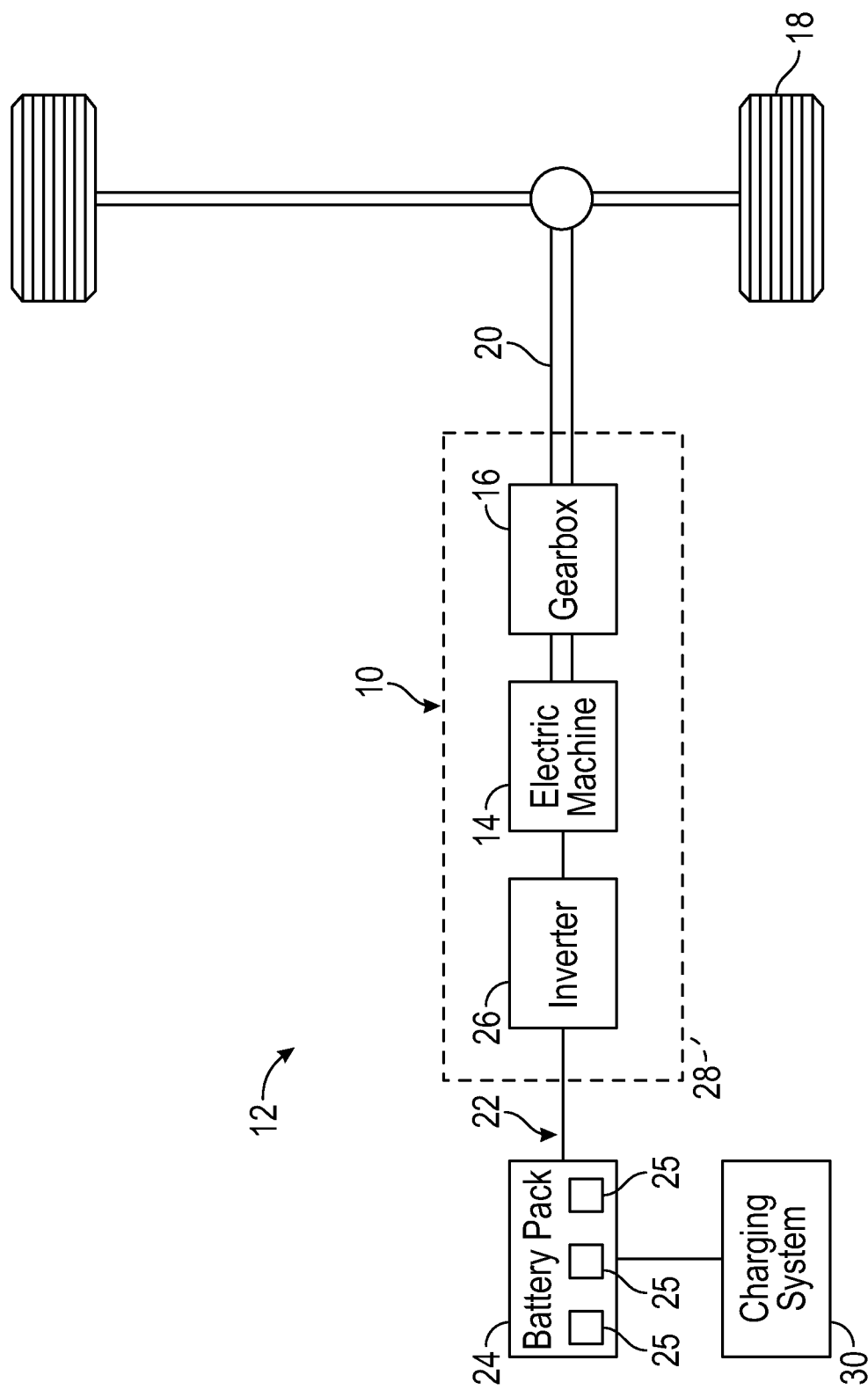
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26, which can also be referred to as an inverter system controller (ISC). The electric machine 14, the gearbox 16, and the inverter 26 may be collectively referred to as a transmission 28 of the electrified vehicle 12.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the battery pack 24. The charging system 30 may include charging components that are located both onboard the electrified vehicle 12 (e.g. vehicle inlet assembly, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
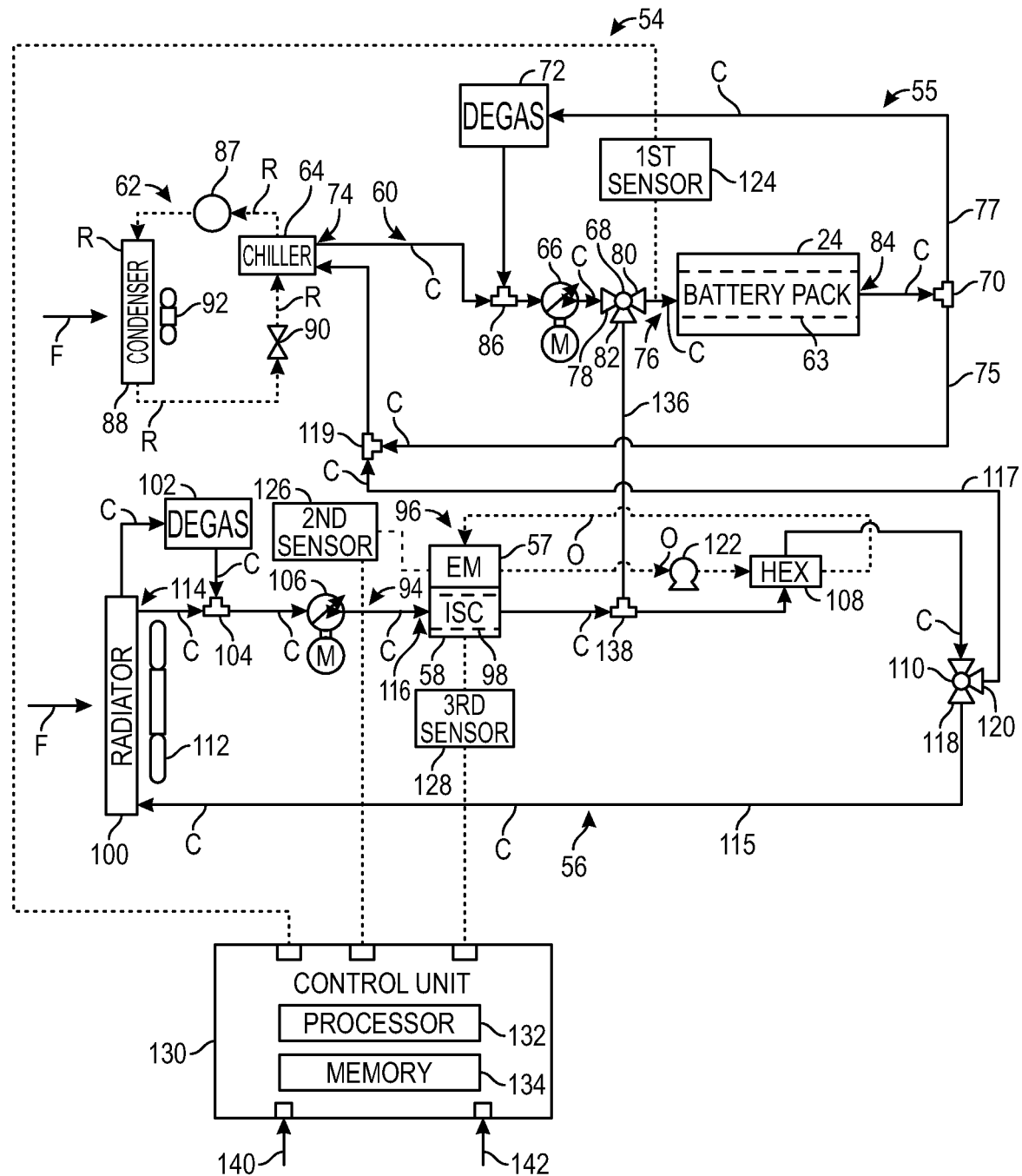
FIG. 2 illustrates a thermal management system for thermally managing a battery pack and an electric drive component of an electrified vehicle according to an exemplary embodiment of this disclosure.

FIG. 2 schematically illustrates a thermal management system 54 that can be incorporated into an electrified vehicle, such as the electrified vehicle 12 of FIG. 1. In an embodiment, the thermal management system 54 includes a battery cooling circuit 55 and an e-drive cooling circuit 56. The battery cooling circuit 55 may be controlled to manage the thermal load generated by the battery pack 24, and the e-drive cooling circuit 56 may be controlled to manage the thermal load generated by one or more electric drive components (e.g., an electric motor 57 and/or an inverter system controller (ISC) 58) of the electrified vehicle 12. As further detailed below, the battery cooling circuit 55 may be combined (i.e., fluidly connected) with the e-drive cooling circuit 56 during certain vehicle operating conditions, such as when excessive heat is generated by the electric drive components of the e-drive cooling circuit 56. For example, excessive heat may be generated in the electric motor 57 and/or the ISC 58 during off road or other relatively extreme duty cycles of the electrified vehicle 12 an during which the electric motor 57 is operated at high torque and low speed conditions (i.e., high load operating conditions).

The battery cooling circuit 55 may include a coolant subsystem 60 for circulating a coolant C and a refrigerant subsystem 62 for circulating a refrigerant R. The coolant subsystem 60 is shown in solid lines and the refrigerant subsystem 62 is shown in dashed lines in FIG. 2. These subsystems are each detailed below.

The coolant subsystem 60, or coolant loop, circulates the coolant C, such as water mixed with ethylene glycol or any other suitable coolant, to thermally manage the battery pack 24. The coolant C may be circulated through an internal cooling circuit 63 of the battery pack 24 for removing heat from battery cells of the battery pack 24 in a convective heat transfer process, for example.

In an embodiment, the coolant subsystem 60 includes at least a chiller 64, a pump 66, a first multi-position valve 68, a T-joint 70, and a degas overflow bottle 72. Although only schematically shown, the various components of the coolant subsystem 60 can be fluidly interconnected by conduits or passages such as tubes, hoses, pipes, etc.

During operation of the coolant subsystem 60, thermal energy is transferred from the coolant C to the refrigerant R of the refrigerant subsystem 62 within the chiller 64 in order to reduce the temperature of the coolant C. The chiller 64 therefore facilitates the transfer of thermal energy between the coolant subsystem 60 and the refrigerant subsystem 62.

The pump 66 circulates the coolant C through the coolant subsystem 60. In an embodiment, the pump 66 is located between an outlet 74 of the chiller 64 and an inlet 76 of the battery pack 24. In another embodiment, the pump 66 is located between the outlet 74 of the chiller 64 and an inlet 78 of the multi-position valve 68. However, the pump 66 could be located elsewhere within the coolant subsystem 60.

The first multi-position valve 68 may be located just upstream of the inlet 76 of the battery pack 24. The first multi-position valve 68, which may be a three-way valve, four-way valve, five-way valve, etc., may be controlled to either fluidly connect or fluidly isolate the e-drive cooling circuit 56 relative to the battery cooling circuit 55. The first multi-position valve 68 may include a first outlet 80 that can be opened to deliver a portion of the coolant C to the inlet 76 of the battery pack 24 and a second outlet 82 that can be opened to deliver a portion of the coolant C to the e-drive cooling circuit 56. In an embodiment, the default position of the multi-position valve 68 is for the first outlet 80 to be open to allow the coolant C to flow to the battery pack 24 and for the second outlet 82 to be closed to prevent the coolant C from flowing to the e-drive cooling circuit 56.

The coolant C that exits from an outlet 84 of the battery pack 24 may flow to the T-joint 70. The T-joint 70 may split the coolant C exiting the battery pack 24 between two different portions, a first portion of which may be returned to the chiller 64 in a coolant line 75 for re-cooling and a second portion of which may be communicated within a coolant line 77 to the degas overflow bottle 72. The degas overflow bottle 72 allows entrained air and gasses in the coolant C to be separated from the coolant C as it flows through the degas overflow bottle 72. The coolant C exiting the degas overflow bottle 72 may be recombined with coolant C communicated from the chiller 64 in an additional T-joint 86.

The refrigerant subsystem 62, or refrigerant loop, of the battery cooling circuit 55 may include a compressor 87, a condenser 88, a thermal expansion valve 90, and the chiller 64. The compressor 87 pressurizes and circulates the refrigerant R through the refrigerant subsystem 62. Thermal energy may be transferred from the refrigerant R to ambient air outside the electrified vehicle within the condenser 88. A fan 92 may be positioned adjacent to the condenser 88 and is configured to draw an airflow F through the condenser 88 for undergoing convective heat transfer with the refrigerant R. For example, the airflow F exchanges heat with the refrigerant R as the two fluids flow across/through the condenser 88.

The cooled refrigerant R may then be communicated to the thermal expansion valve 90. The thermal expansion valve 90 is configured to change (e.g., reduce) the pressure of the refrigerant R prior to communicating the refrigerant R to the chiller 64. The refrigerant R passing to the chiller 64 may exchange heat with the coolant C passing through the chiller 64, thereby cooling the coolant C in order to prepare the coolant C for cooling the battery pack 24 and, periodically, the electric drive components of the e-drive cooling circuit 54. The refrigerant R exiting the chiller 64 may then return to the compressor 87 and the conditioning cycle may repeat itself.

The e-drive cooling circuit 56 of the thermal management system 54 may include a coolant subsystem 94 for circulating a coolant C and a lubricant subsystem 96 for circulating an oil O. The coolant subsystem 94 is shown in solid lines and the lubricant subsystem 96 is shown in dashed lines in FIG. 2. These subsystems are each detailed below.

The coolant subsystem 94 circulates the coolant C, such as water mixed with ethylene glycol or any other suitable coolant, to thermally manage one or more electric drive components of the electrified vehicle 12, such as the electric motor 57 and/or the ISC 58. In an embodiment, the coolant C may be circulated through an internal cooling circuit 98 of the ISC for removing heat from electric drive components in a convective heat transfer process, for example.

In an embodiment, the coolant subsystem 94 includes at least a radiator 100, a degas overflow bottle 102, a T-joint 104, a pump 106, a heat exchanger 108, and a second multi-position valve 110 (e.g., a three-way valve, four-way valve, five-way valve, etc.). Although only schematically shown, the various components of the coolant subsystem 94 can be fluidly interconnected by various conduits or passages such as tubes, hoses, pipes, etc.

During operation of the coolant subsystem 94, thermal energy may be transferred from the coolant C to ambient air outside the electrified vehicle 12 within the radiator 100. A fan 112 may be positioned adjacent to the radiator 100 and is configured to draw an airflow F through the radiator 100 for undergoing convective heat transfer with the coolant C. For example, the airflow F exchanges heat with the coolant C as the two fluids flow across/through the radiator 100.

A portion of the cooled coolant C exiting the radiator may be communicated to the degas overblow bottle 102. The degas overflow bottle 102 separates entrained air and gasses from the coolant C as it flows through the degas overflow bottle 102. The coolant C exiting the degas overflow bottle 102 may be recombined with another portion of the coolant C exiting from an outlet 114 of the radiator 100 within the T-joint 104.

The pump 106 circulates the coolant C through the coolant subsystem 94. In an embodiment, the pump 106 is located between the outlet 114 of the radiator 100 and an inlet 116 of the ISC 58 or any other electric drive component requiring cooling. However, the pump 106 could be located elsewhere within the coolant subsystem 94.

The coolant C exiting the ISC 58 may exchange heat with the oil O of the lubricant subsystem 96 within the heat exchanger 108. In an embodiment, the coolant C heats the oil O within the heat exchanger 108 as the two fluids pass therethrough.

The second multi-position valve 110 may be located downstream from the heat exchanger 108. The second multi-position valve 110 may be controlled to return the coolant C exiting the heat exchanger 108 to the chiller 64 (such as when the first multi-position valve 68 is open to fluidly connect the e-drive cooling circuit 56 and the battery cooling circuit 55), the radiator 100, or both. The second multi-position valve 110 may include a first outlet 118 that can be opened to return the coolant C to the radiator 100 within a coolant line 115 and a second outlet 120 that can be opened to deliver the coolant C back to the chiller 64 of the battery cooling circuit 55 within a coolant line 117. The coolant C communicated within the coolant line 117 may be combined with the coolant C communicated within the coolant line 75 within a T-joint 119 prior to being delivered to the chiller 64. In an embodiment, the default position of the second multi-position valve 110 is for the first outlet 118 to be open to allow the coolant C to flow to the radiator 100 and for the second outlet 120 to be closed to prevent the coolant C from flowing to the chiller 64.

The lubricant subsystem 96 may circulate the oil O for lubricating the internal parts (e.g., bearings) of the electric motor 57. The lubricant subsystem 96 may include a pump 122 and the heat exchanger 108. The pump 122 selectively circulates the oil O through the lubricant subsystem 96. The speed of the pump 122 may be controlled based on a temperature of the electric drive components for which the oil O is used to lubricate. The oil O may be heated by the coolant C of the coolant subsystem 94 within the heat exchanger 108. The warmed oil O exiting the heat exchanger 108 may return to the electric motor 57 for lubricating its internal parts.

The temperature of electric drive components such as the electric motor 57 and the ISC 58 may fluctuate based on many factors, including but not limited to, the current duty cycle and associated operating conditions of the electrified vehicle 12. When the electrified vehicle 12 is operating during off-road or other high load operating conditions (i.e., high torque, low speed conditions), the electric motor 57 and/or the ISC 58 may heat up at a faster rate than can be effectively cooled by the e-drive cooling circuit 56 alone. Therefore, as discussed in greater detail below, it may be desirable to periodically fluidly connect the coolant subsystem 94 of the e-drive cooling circuit 56 to the coolant subsystem 60 of the battery cooling circuit 55 in order to augment the cooling of the electric drive components when certain conditions are met.

The thermal management system 54 may additionally include a first temperature sensor 124, a second temperature sensor 126, and a third temperature sensor 128. The first temperature sensor 124 may be adapted for sensing the temperature of the coolant C after it exits the chiller 64 but before it enters the battery pack 24. In an embodiment, the first temperature sensor 124 is positioned at or near the inlet 76 of the battery pack 24. However, other locations are also contemplated within the scope of this disclosure.

The second temperature sensor 126 may be configured for sensing a temperature associated with the electric motor 57. In an embodiment, the second temperature sensor 126 is configured to sense a stator coil temperature of the electric motor 57. However, other configuration are also contemplated with the scope of this disclosure.

The third temperature sensor 128 may be configured for sensing a temperature associated with the ISC 58. In an embodiment, the third temperature sensor 128 is configured to sense an exterior temperature of the ISC 58. However, other configurations are also contemplated with the scope of this disclosure.

A control unit 130 may control operation of the thermal management system 54, including operation of both the battery cooling circuit 55 and the e-drive cooling circuit 56. The control unit 130 could be a stand-alone control unit associated with the thermal management system 54 or could be part of an overall vehicle control unit, such as a vehicle system controller (VSC) that includes a powertrain control unit, a transmission control unit, an engine control unit, a battery control module, etc. It should therefore be understood that the control unit 130 and one or more other controllers can collectively be referred to as a "control unit" that is configured to control, such as through a plurality of integrated algorithms, various actuators in response to signals from various inputs associated with the thermal management system 54. The various controllers that make up the VSC can communicate with one another using a common bus protocol (e.g., CAN), for example.

In an embodiment, the control unit 130 is programmed with executable instructions for interfacing with and operating the various components of the thermal management system 54 for thermally managing the heat generated by the battery pack 24 and other electric drive components (e.g., the electric motor 57 and the ISC 58). The control unit 130 may include various inputs and outputs for interfacing with the various components of the thermal management system 54, including but not limited to the battery pack 24, the pump 66, the first multi-position valve 68, the thermal expansion valve 90, the fan 92, the pump 106, the second multi-position valve 110, the fan 112, the pump 122, the first temperature sensor 124, the second temperature sensor 126, and the third temperature sensor 128. The control unit 130 may further include a processing unit 132 and non-transitory memory 134 for executing the various control strategies and modes of the thermal management system 54.

In an embodiment, the control unit 130 is configured to control the thermal management system 54 by combining (i.e., fluidly connecting) the battery cooling circuit 55 and the e-drive cooling circuit 56 when excessive heat is being generated within the electric motor 57 and/or the ISC 58. The control unit 130 may receive feedback from each of the first temperature sensor 124, the second temperature sensor 126, and the third temperature sensor 128 for determining whether, via the first multi-position valve 68, the coolant C from the battery cooling circuit 55 is to be permitted to flow to the e-drive cooling circuit 56. If the operating conditions warrant it, the control unit 130 may actuate the second outlet 82 of the first multi-position valve 68 to an open position to deliver the coolant C within a coolant line 136 to a T-joint 138 of the e-drive cooling circuit 56 in order to augment cooling of the electric drive components of the e-drive cooling circuit 56. The coolant C delivered within the coolant line 136 may combine with the coolant C of the e-drive cooling circuit 56 within the T-joint 138, and the combined coolant C may then be communicated to the heat exchanger 108. The control unit 130 may additionally actuate the second outlet 120 of the second multi-position valve 110 to an open position in order to return at least a portion of the coolant C to the chiller 64 for re-cooling.

In another embodiment, the control system 130 is configured to control the thermal management system 54 by fluidly isolating the battery cooling circuit 55 and the e-drive cooling circuit 56 from one another when excessive heat is not being generated within the electric motor 57 and/or the ISC 58. Under these standard operating conditions, the e-drive cooling circuit 56 alone is sufficient to thermally manage the heat generated by the electric motor 57 and/or the ISC 58. The control system 130 may switch between fluidly connecting the circuits 55, 56 and fluidly isolating the circuits 55, 56 based on the feedback received from at least the first temperature sensor 124, the second temperature sensor 126, and the third temperature sensor 128.

In yet another embodiment, the control unit 130 is configured to control the thermal management system 54 by fluidly connecting the battery cooling circuit 55 and the e-drive cooling circuit 56 in order to pre-cool the electric motor 57, the ISC 58, and/or other electric drive components. It may be desirable to pre-cool the electric drive components of the e-drive cooling circuit 56 when high load operating conditions are anticipated in the near future. In an embodiment, the control unit 130 may be programmed to receive a location signal 140 from a navigation system of the electrified vehicle 12 and then predict whether the vehicle is likely to experience high load operating conditions based on the location signal 140. In another embodiment, the control unit 130 may be programmed to receive a drive mode input signal 142 from the user of the electrified vehicle indicating that the vehicle user has selected a heavy-duty cycle drive mode. In either case, the control unit 130 may automatically command the second outlet 82 of the first multi-position valve 68 open to fluidly connect the circuits 55, 56, thereby pre-cooling the electric drive components.

Figure 3:
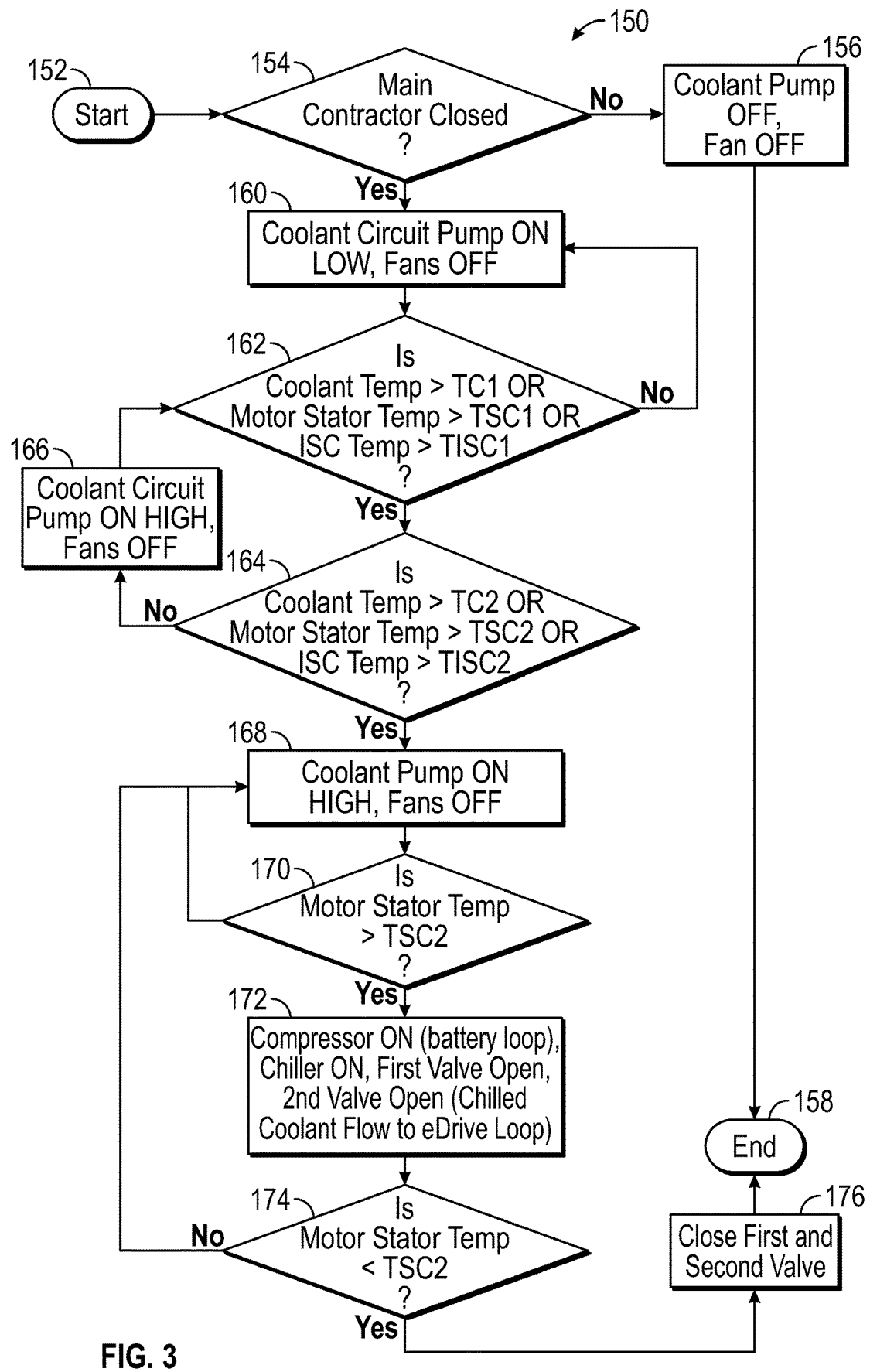
FIG. 3 schematically illustrates a method of controlling the thermal management system of FIG. 2.

FIG. 3, with continued reference to FIGS. 1-2, schematically illustrates an exemplary method 150 for controlling the thermal management system 54 of the electrified vehicle 12. For example, the method 150 may be a control strategy that is executed to determine whether to either fluidly combine the battery cooling circuit 55 and the e-drive cooling circuit 56 of the thermal management system 54 or to maintain the circuits 55, 56 fluidly isolated during vehicle operation. In an embodiment, the control unit 130 of the thermal management system 54 is programmed with one or more algorithms adapted to execute the exemplary method 150, or any other control strategy. In another non-limiting embodiment, the method 150 is stored as executable instructions (e.g., software code) in the memory 134 of the control unit 130.

The method 150 may begin at block 152. At block 154, the control unit 130 may determine whether a main contactor of the battery pack 24 is closed such that electric power is being distributed from the battery pack 24 to the electric motor 57 for achieving electric propulsion of the electrified vehicle 12 (i.e., the battery pack 24 is connected to the voltage bus 22). If a NO flag is returned at block 154, the method 150 may proceed to block 156, at which point the pump 66 and the fan 92 of the battery cooling circuit 55 are commanded OFF (if not already off). The method 150 may then end at block 158.

Alternatively, if a YES flag is returned at block 154, the method 150 may proceed to block 160. At this step, the control unit 130 may command the pump 66 to be turned ON at a low speed setting and may further command the fan 92 to be turned OFF (if not already off).

Next, starting at block 162, the control unit 130 may undertake a series of temperature checks to determine whether the battery cooling circuit 55 and the e-drive cooling circuit 56 should be fluidly combined in order to augment the cooling of the electric motor 57 and/or the ISC 58 of the e-drive cooling circuit 56. For example, the control unit 130 may determine, at block 162, whether a current temperature of the coolant C sensed by the first temperature sensor 124 is greater than a first predefined coolant temperature value $Tc_1$, whether a current stator coil temperature of the electric motor 57 is greater than a first predefined stator coil temperature value $T_{SC1}$, and whether a current temperature of the ISC 58 is greater than a first predefined ISC temperature value $T_{ISC1}$. The first predefined coolant temperature value $Tc_1$, the first predefined stator coil temperature value $T_{SC1}$, and the first predefined ISC temperature value $T_{ISC1}$ may be lower threshold temperature values or ranges of temperature values that may be stored in the memory 134 of the control unit 130. In an embodiment, the first predefined coolant temperature value $Tc_1$ is a temperature greater than the ambient temperature, the first predefined stator coil temperature value $T_{SC1}$ is a temperature that is greater than the first predefined coolant temperature value $Tc_1$, and the first predefined ISC temperature value $T_{ISC1}$ is a temperature that is greater than the first predefined stator coil temperature value $T_{SC1}$ but less than a maximum allowable temperature of the ISC 58. The temperature values $Tc_1$, $T_{SC1}$, and $T_{ISC1}$ are predefined values that may vary depending on various design criteria.

If the current temperature of the coolant C sensed by the first temperature sensor 124 is greater than the first predefined coolant temperature value $Tc_1$, if the current stator coil temperature of the electric motor 57 is greater than the first predefined stator coil temperature value $T_{SC1}$, or if the current temperature of the ISC 58 is greater than the first predefined ISC temperature value $T_{ISC1}$, the control unit 130 may subsequently determine, at block 164, whether a current temperature of the coolant C sensed by the first temperature sensor 124 is greater than a second predefined coolant temperature value $Tc_2$, whether the current stator coil temperature of the electric motor 57 is greater than a second predefined stator coil temperature value $T_{SC2}$, and whether the current temperature of the ISC 58 is greater than a second predefined ISC temperature value $T_{ISC2}$. The second predefined coolant temperature value $Tc_2$, the second predefined stator coil temperature value $T_{SC2}$, and the second predefined ISC temperature value $T_{ISC2}$ may be upper threshold temperature values or ranges of temperature values that may be stored in the memory 134 of the control unit 130. In an embodiment, the second predefined coolant temperature value $Tc_2$ is a temperature that is greater than ambient temperature (but different from $T_{c1}$), the second predefined stator coil temperature value $T_{SC2}$ is a temperature that is greater than the second predefined coolant temperature value $Tc_2$, and the second predefined ISC temperature value $T_{ISC2}$ is a temperature that is greater than the second predefined stator coil temperature value $T_{SC2}$ but less than a maximum allowable temperature of the ISC 58. The temperature values $Tc_2$, $T_{SC2}$, and $T_{ISC2}$ are predefined values that may vary depending on various design criteria.

If the current temperature of the coolant C sensed by the first temperature sensor 124 is not greater than the second predefined coolant temperature value $Tc_2$, the current stator coil temperature of the electric motor 57 is not greater than the second predefined stator coil temperature value $T_{SC2}$, or the current temperature of the ISC 58 is not greater than the second predefined ISC temperature value $T_{ISC2}$ at block 164, then the control unit 130 may proceed to block 166 by commanding the pump 66 to a high speed setting and commanding the fan 92 OFF (if not already off). Alternatively, if the current temperature of the coolant C sensed by the first temperature sensor 124 is greater than the second predefined coolant temperature value $Tc_2$, if the current stator coil temperature of the electric motor 57 is greater than the second predefined stator coil temperature value $T_{SC2}$, or if the current temperature of the ISC 58 is greater than the second predefined ISC temperature value $T_{ISC2}$ at block 164, then the control unit 130 may proceed to block 168 by commanding the pump 66 to a high speed setting and commanding the fan 92 ON.

Next, at block 170, the control unit 130 may again confirm whether the current stator coil temperature of the electric motor 57 is greater than the second predefined stator coil temperature value $T_{SC2}$. If YES, the method 150 may proceed to block 172 and the control unit 130 commands the compressor 87 and the chiller 64 ON, opens the second outlet 82 of the first multi-position valve 68, and opens the second outlet 120 of the second multi-position valve 110 in order to fluidly connect the battery cooling circuit 55 and the e-drive cooling circuit 56. The cooling of the electric motor 57 and/or the ISC 58 is therefore augmented by the chilled coolant C from the chiller 64 of the battery cooling circuit 55.

The control unit 130 may confirm whether the current stator coil temperature of the electric motor 57 has fallen below the second predefined stator coil temperature value $T_{SC2}$ at block 174. If NO, the method 150 may return to block 168. If YES, the method 150 proceeds to block 176, at which time the control unit 130 may command the second outlet 82 of the first multi-position valve 68 and the second outlet 120 of the second multi-position valve 110 closed in order to fluidly isolate/disconnect the battery cooling circuit 55 and the e-drive cooling circuit 56. The method 150 may then end at block 158.

The method 150 described above may be continuously performed during operation of the electrified vehicle 12 in order to continuously monitor the availability and effectiveness of the radiator 100 for thermally managing the electric drive components of the e-drive cooling circuit 56.

Figure 4:
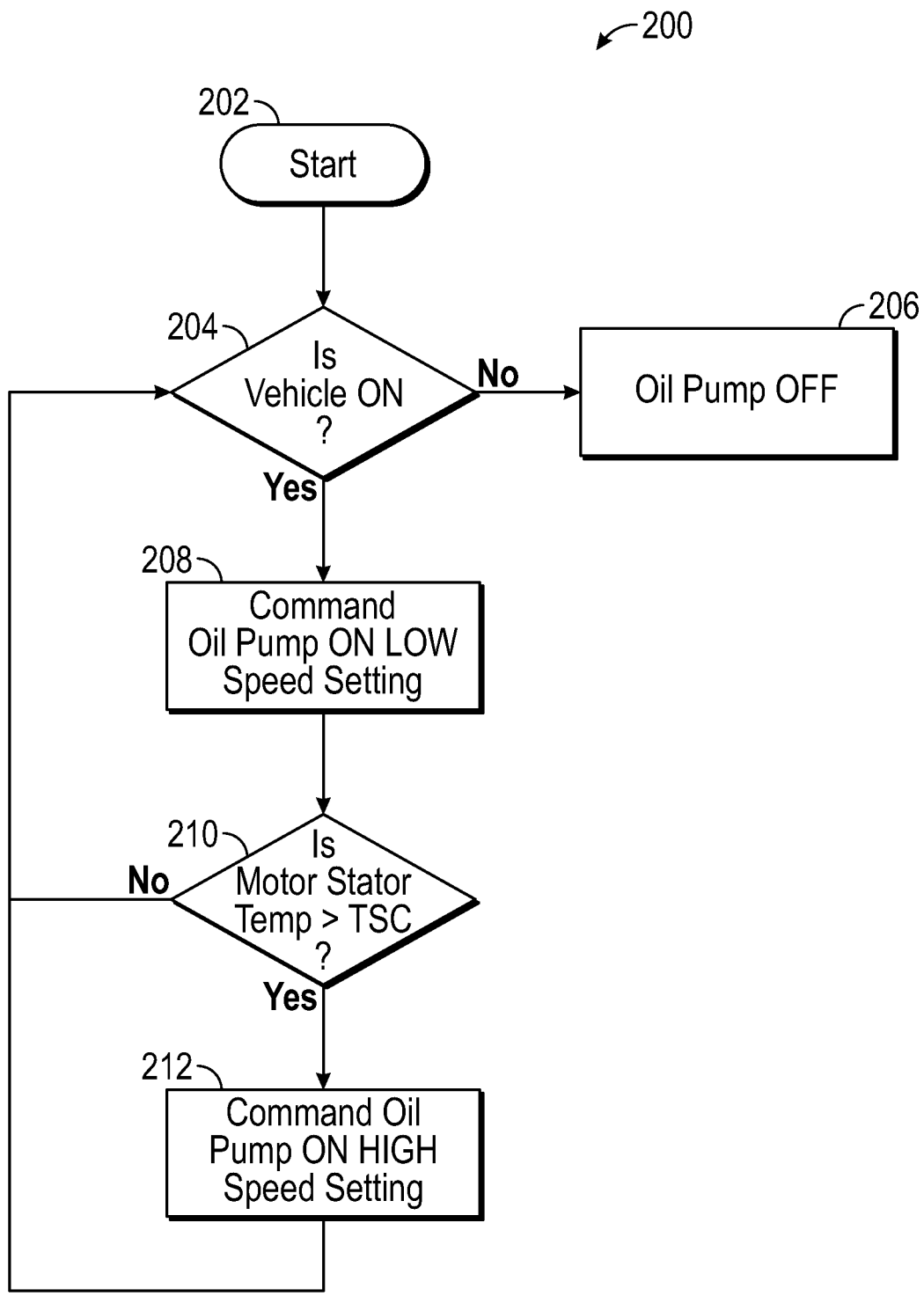
FIG. 4 illustrates a method for controlling an oil pump of the thermal management system of FIG. 2.

FIG. 4, continued reference to FIGS. 1-3, schematically illustrates an exemplary method 200 for controlling the pump 122 of the lubricant subsystem 96 of the e-drive cooling circuit 56 of the thermal management system 54. In an embodiment, the control unit 130 is programmed with one or more algorithms adapted to execute the exemplary method 200. In another embodiment, the method 200 is stored as executable instructions (e.g., software code) in the memory 134 of the control unit 130.

The method 200 begins at block 202. At block 204, the control unit 130 determines whether the electrified vehicle is ON. If NO, the method 200 proceeds to block 206, and the control unit 130 determines that the pump 122 is OFF. Alternatively, if a YES flag is returned at block 204, the method 200 may proceed to block 208 by commanding the pump 122 ON at a low speed setting.

Next, at block 210, the control unit 130 may determine whether the current stator coil temperature of the electric motor 57 is greater than a predefined stator coil temperature value $T_{SC}$. If YES, the control unit 130 commands the pump 122 ON at a high speed setting at block 212. The method 200 may then return to block 204 and the method 200 may be repeated throughout vehicle operation.

The exemplary thermal management systems of this disclosure may periodically fluidly connect the battery and e-drive cooling circuits during conditions in which the electric drive components of the e-drive cooling circuit require additional cooling. The exemplary systems provide the ability to easily switch between cooling electric drive components via only the e-drive cooling circuit and cooling the electric drive components via the combined battery and e-drive cooling circuits. Pre-chilling of the electric drive components can be performed using predictive analysis of user intent.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system, comprising:
a battery pack;
a battery cooling circuit configured to thermally manage the battery pack;
an electric drive component;
an e-drive cooling circuit configured to thermally manage the electric drive component; and
a first multi-position valve disposed immediately upstream from an inlet of the battery pack and being configured to control a flow of a coolant within a coolant subsystem of the battery cooling circuit,
wherein, in a first position of the first multi-position valve, the battery cooling circuit is fluidly isolated from the e-drive cooling circuit,
wherein, in a second position of the first multi-position valve, the battery cooling circuit is fluidly connected to the e-drive cooling circuit such that the coolant is permitted to flow from the battery cooling circuit to the e-drive cooling circuit.

2. The system as recited in claim 1, wherein the electric drive component is an electric motor or an inverter system controller (ISC).

3. The system as recited in claim 1, wherein the battery cooling circuit includes the coolant subsystem and a refrigerant subsystem.

4. The system as recited in claim 3, wherein the coolant subsystem includes a chiller, a pump, the first multi-position valve, at least one T-joint, and a degas overflow bottle.

5. The system as recited in claim 4, wherein the refrigerant subsystem includes a compressor, a condenser, a thermal expansion valve, and the chiller.

6. The system as recited in claim 1, wherein the e-drive cooling circuit includes a coolant subsystem and a lubricant subsystem.

7. The system as recited in claim 6, wherein the coolant subsystem includes a radiator, a degas overflow bottle, at least one T-joint, a pump, a heat exchanger, and a second multi-position valve.

8. The system as recited in claim 7, wherein the lubricant subsystem includes a pump and the heat exchanger.

9. The system as recited in claim 1, comprising a temperature sensor for monitoring a current temperature of the electric drive component, and further comprising a control unit in communication with the temperature sensor and configured to command the first multi-position valve to the second position in response to the current temperature of the electric drive component exceeding a predefined temperature value.

10. The system as recited in claim 9, wherein the control unit is configured to command the first multi-position valve to the first position in response to the current temperature of the electric drive component being less than the predefined temperature value.

11. The system as recited in claim 1, comprising a second multi-position valve configured to control a return flow of the coolant from the e-drive cooling circuit back to a chiller of the battery cooling circuit.

12. The system as recited in claim 11, wherein:
in a first position of the second multi-position valve, the return flow of the coolant is prevented from flowing to the chiller, and
in a second position of the second multi-position valve, the return flow of the coolant is permitted to flow to the chiller.

13. The system as recited in claim 1, comprising a coolant line connecting between the first multi-position valve and a T-joint of the e-drive cooling circuit.

14. A method, comprising:
controlling a flow of a coolant between a battery cooling circuit and an e-drive cooling circuit of a thermal management system of an electrified vehicle, wherein controlling the flow includes:
preventing the flow of the coolant from the battery cooling circuit to the e-drive cooling circuit when a current stator coil temperature of an electric drive component of the e-drive cooling circuit is less than a predefined stator coil temperature value;
allowing the flow of the coolant from the battery cooling circuit to the e-drive cooling circuit when the current stator coil temperature of the electric drive component is greater than the predefined stator coil temperature value; and
fluidly connecting the battery cooling circuit and the e-drive cooling circuit to pre-cool the electric drive component in response to receiving a signal indicating that a vehicle user has selected a heavy-duty cycle drive mode.

15. The method as recited in claim 14, wherein allowing the flow of the coolant includes actuating an outlet of a first multi-position valve from a closed position to an open position to fluidly connect the battery cooling circuit and the e-drive cooling circuit.

16. The method as recited in claim 15, wherein allowing the flow of the coolant includes actuating an outlet of a second multi-position valve from a closed position to an open position to return a portion of the coolant from the e-drive cooling circuit back to the battery cooling circuit.

17. The method as recited in claim 15, wherein allowing the flow of the coolant includes communicating the coolant through the outlet and then into a coolant line that connects between the first multi-position valve and a T-joint of the e-drive cooling circuit.

18. The method as recited in claim 14, comprising automatically allowing the flow of the coolant from the battery cooling circuit to the e-drive cooling circuit to pre-chill the electric drive component in response to a location signal or a drive mode input signal.

19. A thermal management system, comprising:
a battery pack;
a battery cooling circuit configured to thermally manage the battery pack;
an electric motor;
an e-drive cooling circuit configured to thermally manage the electric motor;
a temperature sensor for monitoring a stator coil temperature of the electric motor;
a first multi-position valve disposed immediately upstream from the battery pack and being configured to control a flow of a coolant within the battery cooling circuit;
a second multi-position valve disposed within the e-drive cooling circuit and being configured to control a return flow of the coolant from the e-drive cooling circuit to a chiller of the battery cooling circuit; and
a control unit programmed to command the first multi-position valve and the second multi-position valve to fluidly connect the battery cooling circuit and the e-drive cooling circuit when the stator coil temperature is greater than a predefined stator coil temperature value and to fluidly isolate the battery cooling circuit and the e-drive cooling circuit when the stator coil temperature is less than the predefined stator coil temperature value.

20. The system as recited in claim 19, wherein the control unit is further programmed to automatically command the first multi-position valve to fluidly connect the battery cooling circuit and the e-drive cooling circuit to pre-cool the electric motor in response to receiving a signal indicating that a vehicle user has selected a heavy-duty cycle drive mode.

* * * * *